United States Patent Office 3,108,994
Patented Oct. 29, 1963

3,108,994
PROCESS FOR PREPARING TERMINALLY
REACTIVE POLYMERS
Robert P. Zelinski and Charles W. Strobel, Bartlesville,
Okla., assignors to Phillips Petroluem Company, a corporation of Delaware
No Drawing. Filed Oct. 24, 1960, Ser. No. 64,276
16 Claims. (Cl. 260—93.5)

The invention relates to new and useful polymeric materials and a process for their preparation. In one aspect, the invention relates to terminally reactive polymers. In another aspect, this invention relates to the preparation of carboxy-terminated polymers from the corresponding alkali metal salts. In yet a further aspect, this invention relates to the reduction of the ash content of a polymerization mixture containing inorganic components which form chloride derivatives which are insoluble in the polymerization mixture through the utilization of a suitable reagent. In a further aspect, this invention relates to a method of reacting an alkali metal salt of a telechelic polymer with an anhydrous acid to convert the alkali metal salt of the telechelic polymer to the corresponding acid. In a further aspect, this invention relates to a method of reacting an alkali metal salt of a telechelic polymer with anhydrous hydrogen chloride gas and separating out the alkali metal chloride. In yet another aspect, this invention relates to the recovery of carboxy-terminated polymers from the corresponding alkali metal salts in the absence of water. In a still further aspect, this invention relates to producing carboxy-terminated polymers from polymers containing alkali metal end groups prepared by a method of utilizing organo alkali metal initiators, such as disclosed and claimed in copending application Serial Number 772,167, filed November 6, 1958, by C. A. Uraneck et al.

The term "telechelic" has been coined to define terminally reactive polymers. As used in this application, telechelic polymers means polymers of vinylidene-containing monomers which contain a reactive group such as a carboxy group on each end of the polymer molecule.

Polymers prepared in the presence of an organo polyalkali metal initiator contain terminal alkali metal atoms. Treatment with carbon dioxide produces terminal alkali metal salt groups. Since it is known that a carboxylic acid can be recovered from its metal salt by treatment with an aqueous solution of an acid, it would appear obvious to use such a procedure for converting the alkali metal salt of a carboxy-containing polymer to the corresponding acid. The product could then be washed with water to remove the alkali metal salt as well as excess acid. Such a procedure is a very difficult operation when applied to alkali metal salts of carboxy-containing polymers. When the mixture is agitated sufficiently to effect good contact of water and polymer solution, an emulsion forms immediately and, in most cases, it is very stable. Even very mild agitation produces considerable emulsification.

It has now been found that carboxy-terminated polymers can be produced from the corresponding alkali metal salts without any emulsion problem and with a much smaller quantity of treating agent through the utilization of anhydrous hydrogen chloride rather than an aqueous acid. It has further been found that generally not more than a 20 to 25 percent excess of anhydrous hydrogen chloride is necessary and that very successful operations can be achieved with a stoichiometric amount. It has further been found that carboxy-terminated polymers having a low ash content can be prepared according to this invention without requiring the conventional water washing step.

Therefore, it is an object of this invention to provide new and useful polymeric materials and a process for their preparation. Another object of this invention is to provide terminally reactive polymers having improved properties. Still another object of this invention is to provide for an improved method of preparing carboxy-terminated polymers from the corresponding alkali metal salts. A further object of this invention is the preparation of carboxy-terminated polymers having a lower ash content. Another object of this invention is the elimination of the emulsion problem encountered when treating an alkali metal salt of a carboxy-containing polymer with an aqueous acid. A yet further object of this invention is to provide an improved method of removing the alkali metal components from a polymer prepared in the presence of an organo polyalkali metal initiator.

Other aspects, objects, and the several advantages of the invention are apparent from a study of the disclosure and the appended claims.

According to this invention, there is provided a process for reducing the ash content of a carbonated polymerization mixture containing inorganic components which form chloride derivatives insoluble in the polymerization mixture by treating with anhydrous hydrogen chloride. Also according to this invention, there is provided a process for removing alkali metal atoms from a polymer prepared in the presence of an organo polyalkali metal initiator and subsequently carbonated, by treating said carbonated polymer with anhydrous hydrogen chloride gas. Further, there are provided a process for producing carboxy-terminated polymers from the corresponding alkali metal salts through the treatment of the polymer with carbon dioxide followed by treatment with anhydrous hydrogen chloride gas, and new and improved products prepared by the processes of this invention.

The monomers which can be employed in the preparation of the terminally reactive polymers include a wide variety of materials. The preferred monomers are the conjugated dienes containing from 4 to 12 carbon atoms and preferably 4 to 8 carbon atoms, such as 1,3-butadiene
Isoprene
Piperylene
Methylpentadiene
2-methyl-1,3-butadiene
Phenylbutadiene
3,4-dimethyl-1,3-hexadiene
4,5-diethyl-1,3-octadiene etc. In addition, conjugated dienes containing reactive substituents along the chain can also be employed, such as for example, halogenated dienes, such as chloroprene, fluoroprene, etc. Of the conjugated dienes the preferred material is butadiene, with isoprene and piperylene also being especially suitable. In addition to the conjugated dienes other monomers which can be employed are arylsubstituted olefins, such as styrene, various alkyl styrenes, paramethoxystyrene, vinylnaphthalene, vinyltoluene, and the like; heterocyclic nitrogen-containing monomers, such as pyridine and quinoline derivatives containing at least one vinyl or alpha-methylvinyl group, such as 2-vinylpyridine
4-vinylpyridine
3,5-diethyl-4-vinylpyridine etc.; similar mono- and di-substituted alkenyl pyridines and like quinolines; acrylic acid esters, such as methyl acrylate and ethyl acrylate; alkacrylic acid esters, such as Methyl methacrylate
Ethyl methacrylate
Propyl methacrylate
Ethyl ethacrylate
Butyl methacrylate vinylfuran, N-vinylcarbazole, etc.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group, such as 2,4-divinylpyridine
Divinylbenzene
2,6-divinylpyridine
2,4-divinyl-3-methylpyridine
2,4-divinyl-5-ethylpyridine and the like.

The terminally reactive polymers in addition to including homopolymers and copolymers of the above materials also include block copolymers, which are formed by polymerizing a monomer onto the end of a polymer, the monomer being introduced in such a manner that substantially all of the coreacting molecules enter the polymer chain at this point. In general, the block copolymers can include combinations of homopolymers and copolymers of the materials hereinbefore set forth. A detailed description of block copolymers containing terminally reactive groups and their method of preparation is set forth in the copending application of R. P. Zelinski, Serial No. 737,213, filed May 23, 1958, and now abandoned.

The terminally reactive polymers are prepared by contacting the monomer or monomers which it is desired to polymerize with an organo polyalkali metal compound. The organo polyalkali metal compounds preferably contain from 2 to 4 alkali metal atoms, and those containing 2 alkali metal atoms are more often employed. As will be explained hereinafter, lithium is the preferred alkali metal.

The organo polyalkali metal compounds can be prepared in several ways, for example, by replacing halogens in an organic halide with alkali metals, by direct addition of alkali metals to a double bond, or by reacting an organic halide with a suitable alkali metal compound.

The organo polyalkali metal compound initiates the polymerization reaction, the organo radical being incorporated in the polymer chain and the alkali metal being attached terminally at each end of the polymer chain. The polymers in general will be linear polymers having two ends; however, polymers containing more than two ends can be prepared. The general reaction can be illustrated graphically as follows:

Y—R—P + x[C₄H₆] ⟶

Organo-   Buta-
alkali    diene
metal
compound

Y—R[C₄H₆]ₓ—Y or Y—[C₄H₆]ₐ—R—[C₄H₆]ₓ₋ₐ—Y or combinations thereof.

A specific example is:

Li—(CH₂)₄—Li + x[CH₂=CH—CH=CH₂] ⟶
Li[CH₂—CH=CH—CH₂]ₐ—(CH₂)₄—[CH₂—CH=CH—CH₂]ₓ₋ₐ—Li

In the specific example, 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is, polymer having alkali metal at only one end of the chain is substantially higher. The alkali metals, of course, include Sodium
Potassium
Lithium
Rubidium
Cesium The organic radical of the organo polyalkali metal compound can be an aliphatic, cycloaliphatic or aromatic radical. For example, di- and polyalkali metal substituted hydrocarbons can be employed including 1,4-dilithiobutane
1,5-dipotassiopentane
1,4-disodio-2-methylbutane
1,6-dilithiohexane
1,10-dilithiodecane
1,15-dipotassiopentadecane
1,20-dilithioeicosane
1,4-disodio-2-butene
1,4-dilithio-2-methyl-2-butene
1,4-dilithio-2-butene
1,4-dipotassio-2-butene
Dilithionaphthalene
Disodionaphthalene
4,4'-dilithiobiphenyl
Disodiophenanthrene
Dilithioanthracene
1,2-dilithio-1,1-diphenylethane
1,2-disodio-1,2,3-triphenylpropane
1,2-dilithio-1,2-diphenylethane
1,2-dipotassiotriphenylethane
1,2-dilithiotetraphenylethane
1,2-dilithio-1-phenyl-1-naphthylethane
1,2-dilithio-1,2-dinaphthylethane
1,2-disodio-1,1-diphenyl-2-naphthylethane
1,2-dilithiotrinaphthylethane
1,4-dilithiocyclohexane
2,4-disodioethylcyclohexane
3,5-dipotassio-n-butylcyclohexane
1,3,5-trilithiocyclohexane
1-lithio-4-(2-lithiomethylphenyl)butane
1,2-dipotassio-3-phenylpropane
1,2-di(lithiobutyl)benzene
1,3-dilithio-4-ethylbenzene
1,4-dirubidiobutane
1,8-dicesiooctane
1,5,12-trilithiododecane
1,4,7-trisodioheptane
1,4-di(1,2-dilithio-2-phenylethyl)benzene
1,2,7,8-tetrasodionaphthalene
1,4,7,10-tetrapotassiodecane
1,5-dilithio-3-pentyne
1,8-disodio-5-octyne
1,7-dipotassio-4-heptyne 1,10-dicesio-4-decyne
1,11-dirubidio-5-hendecyne
1,2-disodio-1,2-diphenylethane
Dilithiophenanthrene
1,2-dilithiotriphenylethane
1,2-disodio-1,2-diphenylethane
Dilithiomethane
1,4-dilithio-1,1,4,4-tetraphenylbutane
1,4-dilithio-1,4-diphenyl-1,4-dinaphthylbutane and the like.

While the organo dialkali metal initiators in general can be employed, certain specific initiators give better results than others and are preferred in carrying out the preparation of the terminally reactive polymers. For example, of the condensed ring aromatic compounds, the lithium-naphthalene adduct is preferred, but the adducts of lithium with anthracene and biphenyl can be employed with good results. Of the compounds of alkali metals with polyaryl-substituted ethylenes, the preferred material is 1,2-dilithio-1,2-diphenylethane (lithium-stilbene adduct). One reason why certain of the organo dialkali metals are more effective than others lies in the difficulty of preparing the pure organo dialkali metal compounds. In many instances, the compounds which are formed are mixtures of mono- and dialkali metal compounds, which are less effective in promoting the formation of the terminally reactive polymers. The organo dialkali metal compounds which have been set forth as being preferred, are those which when prepared contain a minimum of the mono-alkali metal compound.

The amount of initiator which can be used will vary depending upon the polymer prepared, and particularly the molecular weight desired. Usually the terminally reactive polymers are liquids, having molecular weights in the range of 1,000 to about 20,000. However, depending on the monomers employed in the preparation of the polymers and the amount of initiator used, semisolid and solid terminally reactive polymers can be prepared having molecular weights up to 150,000 and higher. When the terminally reactive polymers are subjected to curing or reaction with polyfunctional compounds, materials of still higher molecular weight are obtained. Usually the initiator is used in amounts between about 0.25 and about 100 millimoles per 100 grams of monomer.

Formation of the terminally reactive polymers is generally carried out in the range of between −100 and +150° C., preferably between −75 and +75° C. The particular temperatures employed will depend on both the monomers and the initiators used in preparing the polymers. For example, it has been found that the organo-lithium initiators provide more favorable results at elevated temperatures whereas lower temperatures are required to effectively initiate polymerization to the desired products with the other alkali metal compounds. The amount of catalyst employed can vary but is preferably in the range of between about 1 and about 30 millimoles per 100 grams of monomers. It is preferred that the polymerization be carried out in the presence of a suitable diluent, such as Benzene
Toluene
Cyclohexane
Methylcyclohexane
Xylene
n-Butane
n-Hexane
n-Heptane
Isooctane
Mixtures of the foregoing hydrocarbons and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

The terminally reactive polymers prepared in accordance with this process contain an alkali metal atom on each end of the polymer chain and the organic radical of the initiator is present in the polymer chain. These terminally reactive polymers can be treated with reagents to introduce various reactive groups in place of the alkali metal atoms. In the preparation of carboxy-terminated polymers from the corresponding alkali metal salts, the polymers are first treated with carbon dioxide by a suitable method such as pouring the polymer solution onto Dry Ice or by injecting carbon dioxide gas and polymer solution under pressure into separate arms of a T-tube which provides a means for bringing the gas into contact with the polymer; and the resulting alkali metal salts are treated with anhydrous hydrogen chloride gas. The reactions which take place are typified by the following equation, wherein P designates a polymer chain.

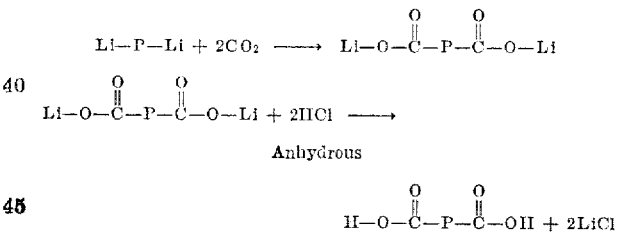

Polymers produced in the presence of organo polyalkali metal initiators generally have an undesirably high ash content unless special methods are employed for its removal. When operating as herein described, the alkali metal chloride precipitates and can be easily removed as a solid either by filtration or centrifugation, leaving a clear product with a very low ash content, without the necessity of washing, thus facilitating solvent recovery.

It is convenient in the present process, although not essential, to have an indicator present in the polymer solution as a means of determining when the required amount of hydrogen chloride has been introduced, as it is desirable that excess hydrogen chloride should not be present in the final carboxytelechelic polymer solution. After carbonation, the polymer solution is treated with gaseous hydrogen chloride to convert the —COOLi terminal groups to —COOH groups. A convenient and preferred method of operation is to use an indicator such as methyl violet, add hydrogen chloride gas until there is a color change, and then back titrate with carbonated polymer solution (solution that has not been hydrogen chloride treated) or purge with nitrogen to remove any excess hydrogen chloride. Other indicators can be used such as methyl red, methyl orange, meta cresol purple, thymol blue, bromophenol blue, and the like.

After treatment with hydrogen chloride, the resulting polymer solution contains precipitated alkali metal chloride and may contain some excess hydrogen chloride. Numerous variations in procedure can be employed for removing these materials. A preferred method is by filtration through diatomaceous earth or activated carbon. This type of treatment removes hydrogen chloride as well as the alkali metal chloride. The solvent is stripped to recover the product. If desired, the treated polymer solution can be purged with nitrogen either before or after filtration. Instead of filtering to remove the alkali metal chloride, the mixture can be centrifuged.

While this invention has been described chiefly in connection with carboxy terminated polymers, it is also applicable in manners similar to that described for the carboxy terminated polymers in the preparation of polymers containing acidic groups such as —POH, $SO_3H$, and the like, and to polymers containing mercapto and hydroxy groups. In general, the process can be used to replace the terminal lithium atom with hydrogen without the use of water.

The following examples are presented in illustration of the invention but are not to be construed as limiting the invention.

EXAMPLE I

A polymerization initiator was prepared by reacting trans-stilbene (1,2-diphenylethylene) with lithium in accordance with the following recipe:

| | Parts by weight |
|---|---|
| Trans-stilbene | 100 |
| Lithium shot | 17.8 |
| Diethyl ether | 1,185 |
| Tetrahydrofuran | 165 |

[1] 50 percent excess added.

The diethyl ether, tetrahydrofuran, and stilbene were charged, lithium was added, and the mixture was heated to 120° F. for one hour while being agitated and then cooled to room temperature.

Butadiene was polymerized in an 80-gallon reactor in accordance with the following recipe:

Parts by weight.
| | |
|---|---|
| 1,3-butadiene | 100. |
| Toluene | 1,000 |
| Lithium-stilbene adduct [1] | 4.66 (24 mmoles). |
| Polymerization temperature, ° F. | 122. |
| Time, hours | 1.0. |
| Conversion, percent | 100 |

Charge order: Toluene, heat to 122° F., lithium-stilbene adduct, butadiene.

[1] Prepared as described above.

The polymer solution was cooled to 28° F. in the reactor and carbonated at blowdown in a one-inch Pownell mixing T. The polymer solution after cooling was passed through the T from bottom to top; carbon dioxide was injected through the sparger, using 23 times the amount theoretically required.

Various acidification and washing techniques were used on a series of 25 pound samples of the carbonated polymer solution. A one-hour acidification period was allowed in each case while the mixture was agitated. Water added with the acid was in equal volume to the 37 percent hydrogen chloride used. Isopropyl alcohol and diethyl ether (added to improve solubility of acid in polymer solution) were added as 2 percent by weight of the polymer solution. Where hydrogen chloride, water, and ethyl alcohol or ether were used, they were mixed prior to addition to the polymer solution. One weight percent phenylbeta-naphthylamine (based on polymer) was added to the polymer solution after acidification was complete. The solvent was finally stripped from the polymer under vacuum followed by a nitrogen purge. A summary of the acidification and washing procedure is shown in Table I.

Table I

| Run No. | | Water Washed Until Neutral | COOH, Percent [3] |
|---|---|---|---|
| 1 [1] | 20 percent excess hydrogen chloride with water and alcohol. | Yes | 1.34 |
| 2 [1] | Three times theoretical hydrogen chloride with water and alcohol. | Yes | 1.33 |
| 3 [1] | Theoretical amount of hydrogen chloride with water and diethyl ether. | Yes | 1.39 |
| 4 [1] | Three times theoretical amount of hydrogen chloride with water and diethyl ether. | Yes | 1.34 |
| 5 [1] | Titrated with hydrogen chloride until neutral in the presence of water and alcohol. | Yes | 1.1 |
| 6 [2] | Hydrogen chloride gas bubbled into agitated polymer solution for one hour; no water or alcohol present. | Yes | 1.43 |
| 7 [1] | 50 percent excess hydrogen chloride with water and alcohol. | one water wash. | 1.30 |
| 8 [2] | Hydrogen chloride gas bubbled into agitated polymer solution for one hour in the presence of alcohol. | Yes | 0.85 |

[1] Solvent removed under vacuum for about 20 hours with 250° F. bath temperature followed by one-hour nitrogen purge under 15 inches mercury vacuum.
[2] Solvent removed under vacuum with 212° F. bath temperature until polymer concentration was at least 95 percent followed by two-hour nitrogen purge under 15 inches mercury vacuum.
[3] Determined by titration with sodium methoxide using thymol blue indicator.

Water washing the polymer solution to remove excess acid and lithium salts was a very difficult operation on account of emulsification with even slight agitation. Where agitation was mild enough to prevent emulsification, proper contact for complete removal of excess acid was not realized. With good agitation, emulsions were formed immediately and were very stable. They were broken by addition of isopropyl alcohol but its use is undesirable on account of the possibility of esterification of the acidified polymers.

The foregoing data show that the use of anhydrous hydrogen chloride with no alcohol present produced the highest carboxy content. When hydrogen chloride gas was used in the presence of isopropyl alcohol, considerable esterification took place as indicated by the low carboxy content (run 8).

Another portion of the carbonated polymer solution was acidified with hydrogen chloride gas in the presence of methyl violet, phenyl-beta-naphthylamine was added, the mixture was filtered through diatomaceous earth, and stripped to remove solvent. This procedure did not involve the operating difficulties encountered when water was used.

EXAMPLE II

Butadiene was polymerized in the manner described in Example I except the initiator level was 21 millimoles instead of 24 millimoles and butadiene was charged prior to the initiator. Quantitative conversion was reached in one hour.

The polymer solution was cooled in the reactor to 40° F. and carbonated at blowdown using a Pownell mixing T as described in Example I. Prior to acidification, 0.25 part by weight per 100 parts polymer of phenyl-beta-naphthylamine was added and anhydrous hydrogen chloride was then passed into the solution in the presence of methyl violet until the mixture was slightly acid. Hydrogen chloride addition in increments over about a one hour period was necessary for complete reaction. A small quantity of carbonated solution was then added until most of the excess acid was reacted. The acidified polymer solution was filtered through diatomaceous earth (Dicalite) to remove excess hydrogen chloride and initiator residue (LiCl), 0.75 part by weight per 100 parts polymer of phenyl-beta-naphthylamine was added, and the solvent was stripped. The product had a carboxy content of 1.40 weight percent. No difficulties were encountered in acidification or recovery of the carbonated polymer.

EXAMPLE III

A carbonated polymer solution was prepared as described in Example I and treated with 10 percent excess hydrogen chloride added as a one molar solution of anhydrous hydrogen chloride in toluene. The treated polymer was worked up in accordance with the following procedures:

(1) Polymer solution washed three times with water. An emulsion formed immediately upon agitation. Isopropyl alcohol was added to break the emulsion. The solvent was stripped and the polymer was dried in a vacuum oven.

(2) Polymer sloution dried without any treatment leaving the initiator residue (LiCl) in the polymer.

(3) Polymer solution filtered through activated carbon (Nuchar W) and dried in a vacuum oven.

(4) Polymer solution centrifuged to remove LiCl and dried in a vacuum oven.

Carboxy content and ash were determined. Results were as follows:

| Polymer Recovery Method | COOH, Percent | Ash, Percent |
| --- | --- | --- |
| 1 | 1.36 | 0.04 |
| 2 | 1.19 | 1.91 |
| 3 | 1.27 | 0.01 |
| 4 | (1) | 0.02 |

[1] Not determined.

These results show that the residue in the polymer solution resulting from hydrogen chloride treatment can be removed satisfactorily by filtration or centrifugation, as shown by the ash content. Difficulties encountered with water washing can, therefore, be eliminated.

EXAMPLE IV

Two samples of the carbonated polymer solution described in Example I were acidified with anhydrous hydrogen chloride gas in the presence of methyl violet until slightly acid. One was filtered through kaolin (a white-burning clay) and the other through diatomaceous earth. In each case the filtrate was clear, the slight excess hydrogen chloride was removed, and the methyl violet was adsorbed on the filtering medium.

Reasonable variation and modification are possible within the scope of the foregoing disclosure and the appended claims to the invention, the essence of which is that there are provided a process for reducing the ash content of a polymerization mixture containing inorganic components which form chloride derivatives insoluble in the polymerization mixture which comprises treating said polymerization mixture with anhydrous hydrogen chloride; an improved process for removing alkali metal atoms from a polymer prepared in the presence of an organo polyalkali metal initiator which comprises treating said polymer with anhydrous hydrogen chloride gas and a process for making a terminally reactive polymer which comprises reacting said polymer with carbon dioxide followed by treating with anhydrous hydrogen chloride gas.

We claim:

1. A process for forming a terminally reactive polymer having terminally reactive groups selected from the group consisting of mercapto, hydroxy, and acidic groups, comprising contacting a monomer system comprising at least one polymerizable vinylidene compound with an organo alkali metal polymerization initiator under polymerization conditions to form a polymer containing terminal alkali metal atoms and having the formula Y—P—Y, wherein P is said polymer and Y is one of said alkali metal atoms, reacting said polymer containing terminal alkali metal atoms with a suitable reagent to form a polymeric material having the formula R—P—R, where R is selected from the group consisting of —OY, —SY, and alkali metal salt of an acid, O being oxygen and S being sulfur, and treating said polymeric material with anhydrous hydrogen chloride to form a terminally reactive polymer having terminally reactive groups selected from the group consisting of mercapto, hydroxy, and acidic groups.

2. A process in accordance with claim 1 wherein said polymeric material comprises a solution of said polymeric material in a diluent, and further comprising separating the resulting alkali metal chloride from the thus formed terminally reactive polymer by filtering the resulting alkali metal chloride from said solution after said solution has been subjected to the treating step.

3. A process in accordance with claim 1 wherein said monomer system comprises at least one conjugated diene having from 4 to 12 carbon atoms per molecule.

4. A process in accordance with claim 3 wherein said reagent is carbon dioxide and said alkali metal salt is an alkali metal salt of a carboxylic acid.

5. A process in accordance with claim 3 wherein said polymer containing terminal alkali metal atoms has a molecular weight of at least 1,000.

6. A process in accordance with claim 5 further comprising separating the resulting alkali metal chloride from the thus formed terminally reactive polymer.

7. A process in accordance with claim 6 wherein said organo alkali metal polymerization initiator is a dilithium substituted hydrocarbon.

8. A process in accordance with claim 1 wherein said monomer system comprises butadiene.

9. A process in accordance with claim 8 wherein said organo alkali metal is 1,4-dilithio-2-methyl-2-butene.

10. A process in accordance with claim 8 wherein said organo alkali metal is dilithionaphthalene.

11. A process in accordance with claim 1 wherein said monomer system comprises styrene and said organo alkali metal is 1,2-dilithio-1,2-diphenylethane.

12. A process for forming a terminally reactive polymer comprising contacting a monomer system comprising at least one polymerizable vinylidene compound with an organo alkali metal polymerization initiator under polymerization conditions to form a polymer containing terminal alkali metal atoms, reacting said polymer containing terminal alkali metal atoms with a carbonating agent to form an alkali metal salt, and treating said alkali metal salt with anyhdrous hydrogen chloride to form the terminally reactive polymer.

13. A process for making a terminally reactive polymer which comprises contacting a monomer system comprising at least one conjugated diene having from 4 to 8 carbon atoms per molecule with an organo polyalkali metal polymerization initiator, the amount of said initiator being in the range of about 1 to about 30 millimoles per 100 grams of monomer, subjecting the mixture thus obtained to a temperature in the range of about $-75°$ C. to about $+75°$ C. in the presence of a hydrocarbon diluent containing from 4 to 10 carbon atoms per molecule to form a polymer containing terminal alkali metal atoms, said polymer having a molecular weight in the range of about 1000 to about 150,000 reacting said polymer with carbon dioxide to produce a carbonated polymer having terminal groups of an alkali metal salt of a carboxylic acid, and reacting said carbonated polymer with anhydrous hydrogen chloride gas in an amount of about 1 to 1.25 times the stoichiometric amount to produce a carboxy terminated polymer, and separating out the resulting alkali metal chloride.

14. A process for making a carboxy terminated polymer which comprises contacting a monomer system comprising at least one conjugated diene having 4 to 12 carbon atoms per molecule with an organo polyalkali metal polymerization initiator, the amount of said initiator being in the range of about 0.25 to about 100 millimoles per 100 grams of monomer, subjecting the mixture thus obtained to a temperature in the range of about $-100°$ C. to about $+150°$ C. to form a polymer containing terminal alkali metal atoms, said polymer having a molecular weight of at least 1000, reacting said polymer with carbon dioxide to produce a carbonated polymer having terminal groups of an alkali metal salt of a carboxylic acid, and reacting said carbonated polymer with anhydrous hydrogen chloride in an amount of about 1 to 1.25 times the stoichiometric amount to produce a carboxy terminated polymer, and separating out the resulting alkali metal chloride.

15. A process for forming a mercapto terminated polymer comprising contacting a monomer system comprising at least one polymerizable vinylidene compound with an organo alkali metal polymerization initiator under polymerization conditions to form a polymer containing terminal alkali metal atoms and having the formula Y—P—Y, wherein P is said polymer and Y is one of said alkali metal atoms, reacting said polymer containing terminal alkali metal atoms with a suitable reagent to form a polymeric material having the formula YS—P—SY, where S is sulfur, and treating said polymeric material with anhydrous hydrogen chloride to form a mercapto terminated polymer having the formula HS—P—SH, where H is hydrogen.

16. A process for forming a hydroxy terminated polymer comprising contacting a monomer system comprising at least one polymerizable vinylidene compound with an organo alkali metal polymerization initiator under polymerization conditions to form a polymer containing terminal alkali metal atoms and having the formula Y—P—Y, wherein P is said polymer and Y is one of said alkali metal atoms, reacting said polymer containing terminal alkali metal atoms with a suitable reagent to form a polymeric material having the formula YO—P—OY, where O is oxygen, and treating said polymeric material with anhydrous hydrogen chloride to form a hydroxy terminated polymer having the formula HO—P—OH, where H is hydrogen.

References Cited in the file of this patent
UNITED STATES PATENTS

| | | |
|---|---|---|
| 1,980,396 | Fuelnegg et al. | Nov. 13, 1934 |
| 2,447,610 | Calfee | Aug. 24, 1948 |
| 2,631,175 | Crouch | Mar. 10, 1953 |
| 2,952,683 | Warner | Sept. 13, 1960 |
| 3,005,807 | Schultze et al. | Oct. 24, 1961 |
| 3,055,952 | Goldberg | Sept. 25, 1962 |

UNITED STATES PATENT OFFICE
CERTIFICATE OF CORRECTION

Patent No. 3,108,994                      October 29, 1963

Robert P. Zelinski et al.

It is hereby certified that error appears in the above numbered patent requiring correction and that the said Letters Patent should read as corrected below.

Column 10, line 15, for "alkali metal salt" read -- polymeric material --.

Signed and sealed this 21st day of April 1964.

(SEAL)
Attest:

ERNEST W. SWIDER                      EDWARD J. BRENNER

Attesting Officer                       Commissioner of Patents